United States Patent [19]

Heinz et al.

[11] Patent Number: 5,075,809
[45] Date of Patent: Dec. 24, 1991

[54] ROTARY MAGNETIC HEAD TAPE-SCANNING DEVICE WITH HEADS PROTECTED FROM CROSS-TALK BY MOUNTING ON A HEAD CARRIER AND BY ANNULAR SHIELDING OF A PORTION OF THE HEAD PROJECTING FROM THE HEAD CARRIER

[75] Inventors: Richard Heinz, Muhltal; Hartmut Willmann, Gross-Zimmern; Jörn Lützeler, Zwingenberg, all of Fed. Rep. of Germany

[73] Assignee: BTS Broadcast Television Systems GmbH, Darmstadt, Fed. Rep. of Germany

[21] Appl. No.: 355,773

[22] Filed: May 23, 1989

[30] Foreign Application Priority Data

Jul. 15, 1988 [DE] Fed. Rep. of Germany ....... 3824045

[51] Int. Cl.$^5$ .......................... G11B 5/10; G11B 15/00
[52] U.S. Cl. ..................................... 360/128; 360/84; 360/110; 360/130.22; 360/129
[58] Field of Search ............... 360/128, 130.22, 130.23, 360/84, 95, 129

[56] References Cited

U.S. PATENT DOCUMENTS

| | | | |
|---|---|---|---|
| 4,636,902 | 1/1987 | Dalziel et al. | 360/128 X |
| 4,816,950 | 3/1989 | Heinz et al. | 360/128 |
| 4,891,726 | 1/1990 | Suwa et al. | 360/84 |
| 4,935,830 | 6/1990 | Hiraoka et al. | 360/128 X |
| 4,935,832 | 6/1990 | Das et al. | 360/112 X |

FOREIGN PATENT DOCUMENTS

3420317C2   4/1987   Fed. Rep. of Germany .

Primary Examiner—Aristotelis Psitos
Assistant Examiner—Alfonso Garcia
Attorney, Agent, or Firm—Frishauf, Holtz, Goodman & Woodward

[57] ABSTRACT

A magnetic head affixed to the underside of a carrier body mounted at the periphery of a head-wheel for scanning oblique tracks on a magnetic tape is provided with shielding of ferrite, mu-metal or amorphous iron, to reduce magnetic crosstalk. The shielding surrounds the part of the magnetic head that projects beyond the head carrier body except for a small portion near the polished surface that needs to be left uncovered to avoid interfering aerodynamically with the contact of the magnetic head with a magnetic tape. One piece of the shielding is of rectilinear shallow U-shaped profile, forming a pocket for the magnetic head below the carrier body, and extends beyond the tip of the carrier body, where the second piece of shielding material completes an annular shielding ring around the end of the magnetic head. This shielding is particularly useful for an after-check playback head used during recording to check on the quality of the recorded signals.

15 Claims, 4 Drawing Sheets

ROTARY MAGNETIC HEAD TAPE-SCANNING DEVICE WITH HEADS PROTECTED FROM CROSS-TALK BY MOUNTING ON A HEAD CARRIER AND BY ANNULAR SHIELDING OF A PORTION OF THE HEAD PROJECTING FROM THE HEAD CARRIER

This invention concerns a magnetic tape scanning device for tape recording and playback having a rotary body, usually in the form of a disc or drum, with several magnetic head carriers disposed on the periphery of the rotary body each of which carries a magnetic head in position for scanning oblique tracks on magnetic tape. More particularly, the invention concerns the provision of means for preventing cross-talk between the magnetic heads respectively mounted on the several head carriers on the same rotary body.

The disposition of magnetic head carriers or holders on a rotary scanning drum, with a magnetic head in each holder with the periphery of the scanning drum is illustrated in German Patent 34 30 317 C2. In that case the holder for the magnetic head also holds a magnet with cooperates with a fixed pick-up coil for registering the speed of rotation of the rotary body. That holder does not provide any magnetic shielding of the magnetic head.

U.S. Pat. No. 4,816,950, issued Mar. 28, 1989, discloses magnetic heads disposed at various places on the periphery of a headwheel and provided with magnetic shunts, in some cases bridging over a magnetic head where it is mounted on the headwheel, and diverting, by concentrating, the stray field of the magnetic head, thereby reducing magnetic cross talk in a magnetic tape equipment using a large number of magnetic heads distributed on the periphery of a rotary headwheel. In this known device, however, the individual magnetic heads are mounted directly on the periphery of a rotary headwheel. The various embodiments there disclosed of magnetic shunts for stray magnetic fields in the neighborhood of a magnetic head can only insufficiently reduce crosstalk.

SUMMARY OF THE INVENTION

It is an object of the present invention to provide an improved shielding effect for avoiding cross-talk between magnetic heads mounted on a rotary body.

Briefly, a magnetic head on a headwheel is protected from cross-talk by mounting it on a head carrier and by providing it with a shielding structure which may include the head carrier and surrounds the portion of the magnetic head projecting away from the carrier except at its very tip portion. Preferably the shielding structure includes a bridging piece which together forms a pocket with the head carrier and surrounds the portion of the head, except its tip, which extends beyond the place where the head projects from the head carrier, with or without a cooperating shielding strip which together with the bridging piece surrounds the projecting portion of the magnetic head practically to, but just short of, its polished tip surface.

The invention has the advantage of an improvement of about 20 dB in the shielding of the magnetic head. Furthermore the dimensions of the shielding structure are small enough for the shielding to be provided on a head carrier (length of 2.5 mm, width of 4.3 mm and height of 1 mm). This shielding structure has the advantage that it also provides some mechanical protection of the magnetic heads against damage.

It is particularly desirable for the shielding elements which surround the magnetic head in its portion extending radially beyond the head carrier to be made of ferrite. The ferrite may be either sintered in a mold, in which case the shielding piece may be integrated into one molded part, or else the shielding elements may be separate and fitted together. For a close fit it is desirable to use laser machining or ultrasonic piercing to provide the elongated opening through which the tip of the magnetic head protrudes out of the shielding.

BRIEF DESCRIPTION OF THE DRAWINGS

The invention is further described by way of illustrative example with reference to the annexed drawings in which.

DESCRIPTION OF THE ILLUSTRATED EMBODIMENT

In video tape recording and playback equipment of recent manufacture several magnetic heads are affixed to the periphery of a headwheel in order to scan a tape that is advanced obliquely past the revolving magnetic heads. In this way signals are recorded on the magnetic tape or picked up from the tape. For checking or verifying a recording, the individual tracks are read, in an after-check operation on the tape, by means of following magnetic playback heads. In addition, revolving erase heads can be provided for editing video signals. Since the recording, playback and erasing magnetic heads disposed on the same headwheel lie close to each other, the playback heads pick up stray magnetic fields propagating from the recording and erasing heads, in addition to the useful magnetic fields picked up from the tape, so that a signal picked up by an after-check head during recording is greatly disturbed. In addition to the magnetic stray fields just mentioned propagating from neighboring recording heads, the revolving playback heads also pick up magnetic fields that are radiated, or inductively propagated, from erasing heads, electric motors and other sources within the video tape equipment.

Figure 1:
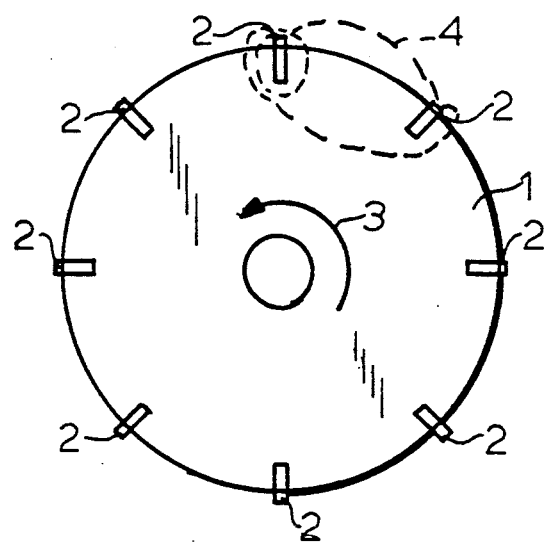
FIG. 1 is a schematic diagram of a headwheel seen in a top view, on which eight head carriers (each holding an unshown magnetic head) are mounted on the wheel periphery.

FIG. 1 shows schematically a headwheel 1 in the shape of a disc or thin drum having carriers 2 for magnetic heads. The carriers 2 are affixed to the periphery of the headwheel and serve to hold magnetic heads of the kind shown in FIG. 2, in a manner illustrated in FIGS. 3-5. The headwheel 1 of FIG. 1 is a part of a cylindrical tape scanning device which is not shown and which may, for example, include stationary drums on each side of the headwheel and guide rollers for the advancing tape, in a well known configuration. The magnetic tape (likewise not shown) is looped helically around the scanning device. When the headwheel 1 revolves in the direction of the arrow 3 video signals are recorded in tracks running obliquely to the tape edges. When the headwheel is equipped for after-check of recording, the stray fields 4 shown in broken lines in FIG. 1 arise between two magnetic heads 2.

Figure 2:
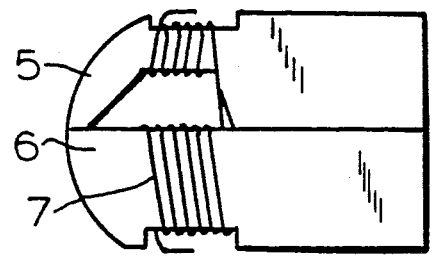
FIG. 2 is a schematic top view of a magnetic head shown all by itself.

As shown in FIG. 2, each magnetic head 2 of FIG. 1 consists essentially of two legs 5 and 6 and a winding 7.

Figure 3:
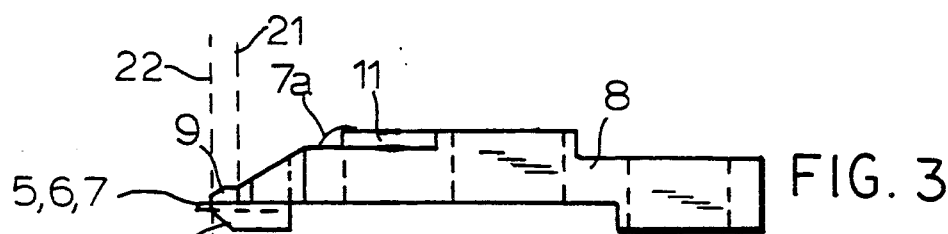
FIG. 3 is a side view of a magnetic head carrier holding in position a magnetic head in a structure according to the invention.
Figure 4:
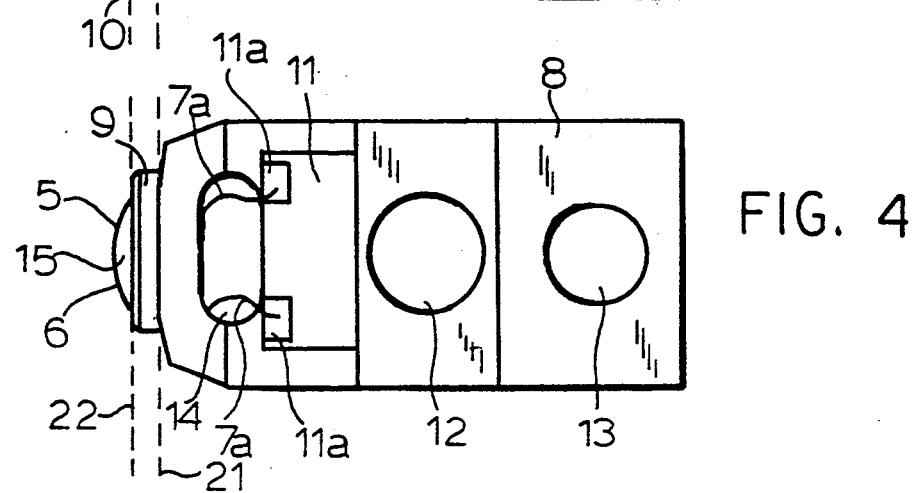
FIG. 4 is a top view of the carrier and head of FIG. 3.

FIG. 3 shows, in side view, a head carrier 8 having a magnetic head 5, 6, 7 affixed to it, magnetic shielding elements 9 and 10 and a small circuit board 11 to which the connections of the winding 7 of the magnetic head are secured. FIG. 4 is a top view of the head carrier 8 shown in FIG. 3. The same elements are provided with the same reference numerals in both of these drawings. In the FIG. 4 top view three apertures are visible, of which the round holes 12 and 13 are provided to facilitate fixing and adjustment of the head carrier 8 on the headwheel 1 by means not shown and the elongated opening 14 which provides for passage of the winding ends 7a of the magnetic head winding 7 to the contact lands 11a on the circuit board 11.

The magnetic head 5, 6, 7, which is barely visible in FIGS. 3 and 4, is fastened to the underside of the head carrier 8. In the FIG. 4 top view only the portion of the polished part of the magnetic heads 5, 6, 7 is visible. The head gap 15 between the two pole legs 5 and 6 can be seen there. The remainder of the region adjoining the polished working surface of the head is covered by a strip 9 of the magnetic shielding. The provision of the shielding is facilitated by the presence the carrier 8.

In FIGS. 3 and 4 there are drawn a vertical broken line 21 passing through the radially outward ed of the head carrier 8 and a chained-dotted line 22 passing through the radially outward extremity of the shielding structure 9, 10. The portion of the magnetic head 5, 6, 7 extending radially outward from the line 21 (beyond the tip of the carrier) is sometimes referred to herein as the first portion of the magnetic head and the remainder of the magnetic head to the right of the line 21 in FIGS. 3 and 4 is sometimes referred to as its second portion. That part of the first portion of the magnetic head to the left of the line 22, protruding out of the shielding structure is a very small tip region of the just-mentioned first portion of the magnetic head 5, 6, 7.

Figure 5:
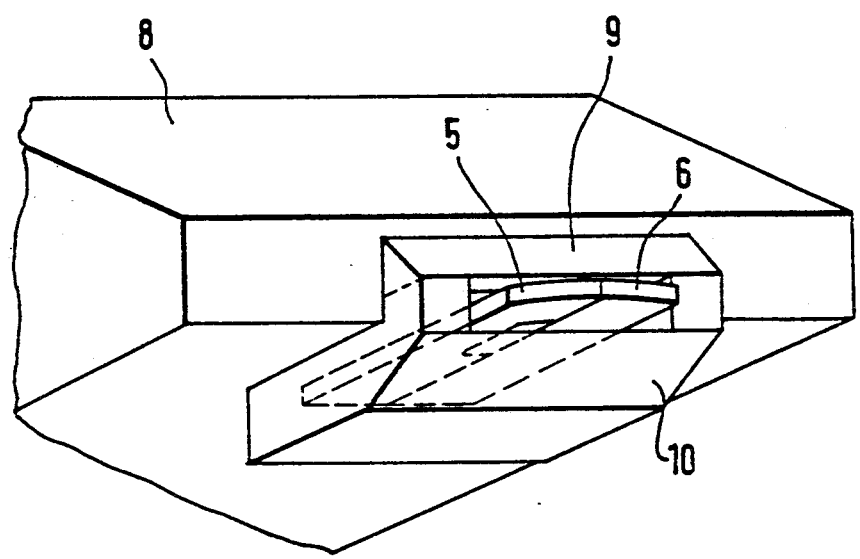
FIG. 5 is a perspective view of the working end of a magnetic head carrier, carrying a shielded magnetic head in accordance with the invention.

The perspective view, provided in FIG. 5, of the tip end or front portion of the head carrier 8 shows the magnetic head 5, 6 with its second portion affixed to the underside of the carrier 8 and shows the shielding structure 9, 10 on a larger scale. In order the show the configuration more clearly, the winding 7 of the magnetic head 5, 6 is not shown in the drawing.

In the illustrated embodiment the magnetic shielding is composed of a ferrite part 10 of rectilinear and shallow U-shaped profile that covers all of the magnetic head 5, 6 except for a small region (the radially extreme portion) located at its polished edge. The region of the head where the magnetic winding 7 is located and also the tip portion of the magnetic head remote from the polished surface are encased in a pocket by the ferrite part 10. The remaining forward part to the left of the line 21 in FIG. 3 (first portion) of the magnetic head which would be left open to stray fields is covered, except for the small tip portion the edges of the polished surface, by the strip 9 which is also of ferrite material, so that except for the polished tip portion of the head, the first portion of the magnetic head, projecting beyond the head carrier 8, is annularly surrounded by high quality magnetic shielding. The portions of the parts 9 and 10 of the shielding reaching towards the polished part of the head are of a configuration which is fitted to the polished surface contour of the magnetic head 5, 6, in order to avoid disturbing the contact between the magnetic head 5, 6 and the tape by the building up of an undersired air cushion.

Figure 7:
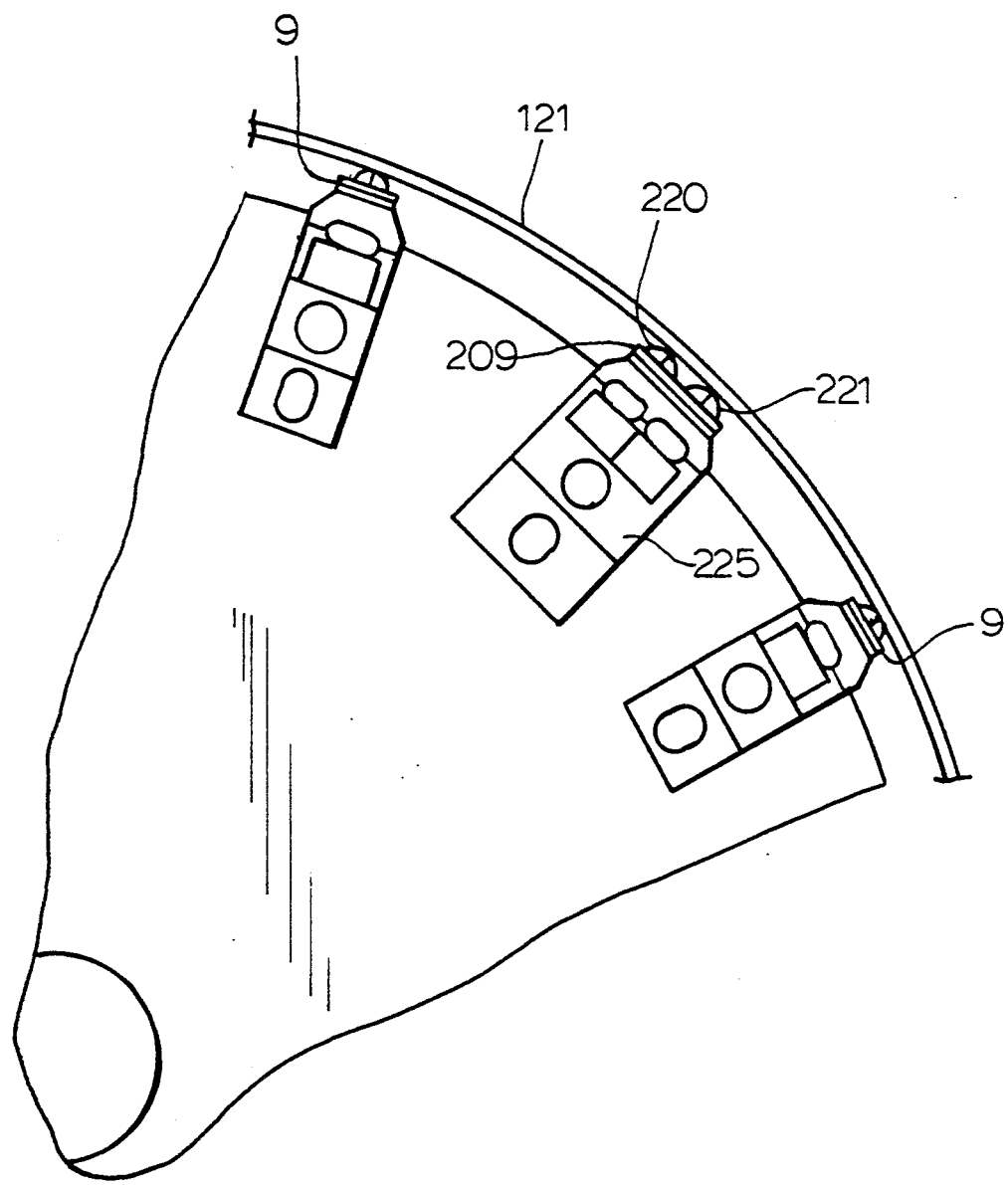
FIG. 7 is a top view of a magnetic head carrier having two magnetic heads affixed thereto and a shielding structure surrounding both heads.

The shielding structure shown in FIGS. 3-5 protects in each case only a single magnetic head. If two or more magnetic heads are provided on a single head carrier, the shielding can have a configuration such that one or more of the magnetic heads on the same head carrier can be surrounded by the shielding, as shown in FIG. 7, where the heads 220 and 221, of which only the tip portions are visible, are affixed to the underside of the carrier 225 and are surrounded, beyond the tip of the carrier by a shielding structure including the strip 209 corresponding to the strip 9 in FIGS. 4 and 5, which is mounted on a u-shaped piece (not shown) corresponding to the u-shaped piece 10 of FIGS. 4 and 5. Another possible use of the invention is to equip with shielding only certain head carriers on the periphery of the rotary body, for example only the playback magnetic heads.

In the above-described embodiment, the magnetic shielding 9, 10 consists of two parts. Of course the shielding structure can also be made in a single piece. In such a case there is the possibility of manufacturer by sintering ferrite material in one-piece in a mold which shapes the one-piece shielding structure. The laterally elongated annular portion of the shielding providing the front opening can be shaped by laser machining or ultrasonic piercing of the opening, as well as by other machining processes.

Figure 6:
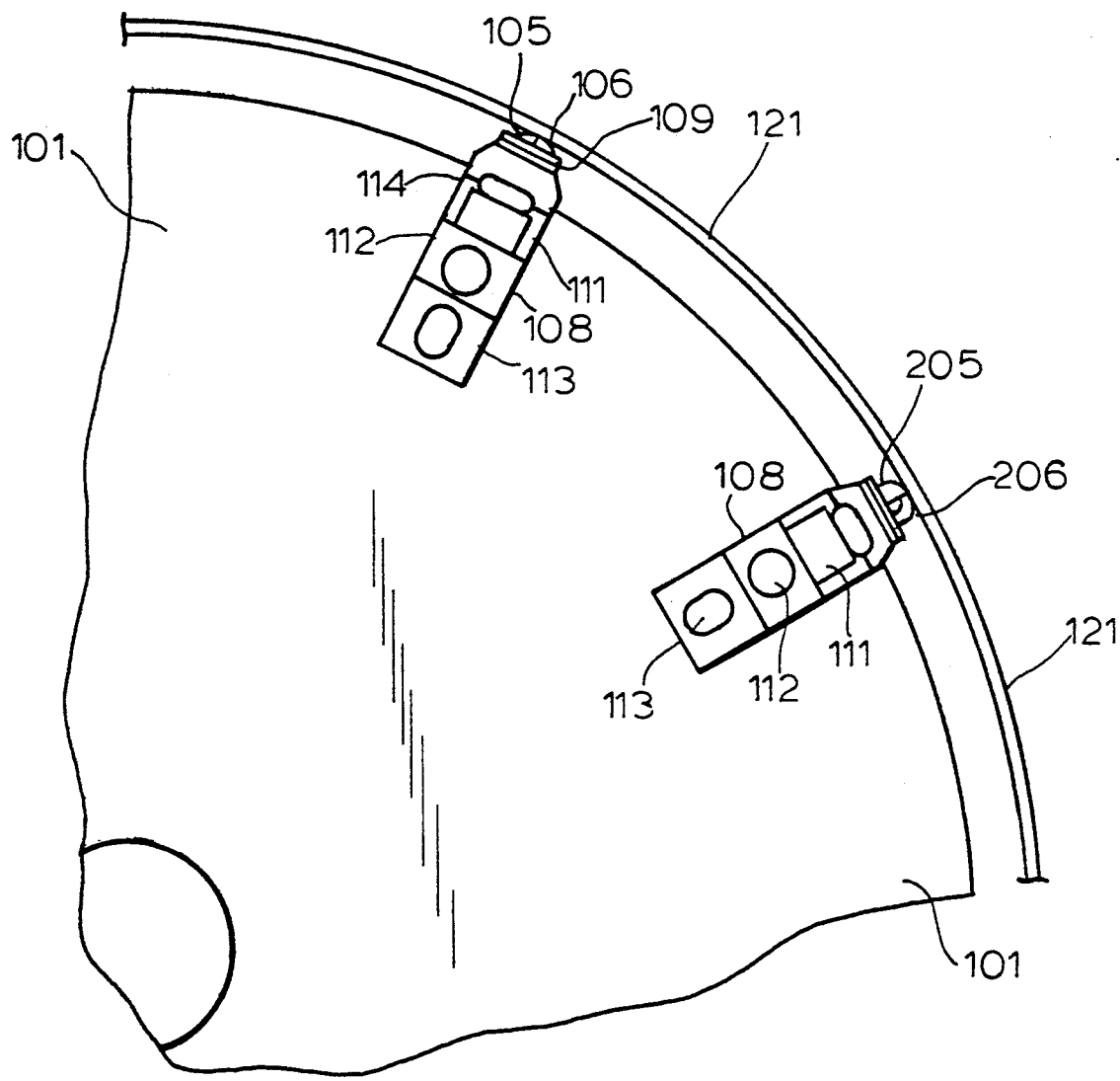
FIG. 6 is a partial top view of a head-wheel carrying magnetic heads not all of which are equipped with a shielding structure according to the invention.

FIG. 6 shows a portion of a headwheel 101, which is like the headwheel 1 in FIG. 1 except that not all of the heads are provided with the magnetically shielding structure in accordance with the invention. The head having the two cores halves 105 and 106 is mounted on a carrier 108 like the carrier 8 of FIGS. 3 and 4 and is shielded in the same manner as the head, 5, 6, 7 is shielded in FIGS. 3 and 4. The shielding structure part 109 corresponds to the strip 9 of FIGS. 3 and 4 and the portion of the shielding structure corresponding to the part 10 in FIG. 3 is not visible in FIG. 6.

The apertures 112, 113 and 114 in FIG. 6 corresponds to the apertures 12, 13 and 14 in the carrier 8 shown in FIG. 4 and the circuit board 111 of FIG. 6 corresponds to the circuit board 11 of FIGS. 3 and 4.

The head having the core halves 205 and 206 in FIG. 6 is not provided with the shielding structure 9, 10, but it is held in place flush against the bottom of the carrier 8 without the benefit of any shielding structure.

The carrier on which the head having the core halves 205 and 206 is mounted is identical with the carrier 108 and accordingly it and its features which are the same as those of the other carrier shown in FIG. 6 are designated by the same reference numerals.

FIG. 6 also shows the tape 121 in contact with both the head 105, 106 and the head 205, 206.

The material for the shielding structure does not need to be a ferrite material and so-called mu-metal and amorphous iron are also suitable. In other words the material should have low magnetic reluctance and high magnetic permeability. If a suitable material is available in the form of a foil or sheet material, the production of the shielding structure can take place by etching or by some other an erosion process. It can therefore be seen that although the invention has been described with reference to a particular illustrative example, variations and modifications are possible within the inventive concept.

We claim:

1. A rotary multiple-magnetic-head device of a recording and/or playback apparatus for scanning magnetic tape records comprising:

a headwheel (1) having an axis of revolution and having a periphery, and a plurality of magnetic head carriers (8) each mounted at the periphery of said headwheel and each having a tip portion extending radially beyond the headwheel periphery;

a plurality of magnetic heads respectively mounted on a corresponding plurality of said carriers, each said head having a first portion projecting away from said axis beyond the tip portion of the carrier on which it is mounted, for intermittent contact of a tip region of said first magnetic head portion with said tape when said headwheel revolves, and a second portion affixed to said carrier having a surface substantially flush with a surface of said tip portion of said carrier on which it is mounted;

a magnetically shielding structure of a material having low magnetic reluctance and high magnetic permeability mounted on each said carrier on which a head of said plurality of heads is mounted and surrounding part of said first portion and covering said second portion of the magnetic head mounted on the respective carrier, said shielding structure being of a configuration which forms, together with the carrier on which it is mounted, a pocket within which is encased all but said tip portion of said magnetic head mounted on said carrier.

2. A magnetic head device according to claim 1, in which said magnetically shielding structure includes a first piece having a cross-sectional profile of a shallow rectilinear U-shape having a closed end and an open end and having its open end extending beyond the carrier on which it is mounted, said first piece being affixed to said carrier on the side of said carrier which is elsewhere adjacent and affixed to said headwheel, and a second piece in strip form fitting against a portion of said first piece adjacent to its open end for surrounding all but said tip region of said first portion of the magnetic head mounted on the carrier.

3. A magnetic head device according to claim 1, in which said magnetically shielding structure, where it surrounds part of said first portion of a said magnetic head mounted on a said carrier provides an aperture fitting and thereby surrounding all but said tip region of said first portion of said magnetic head mounted on said carrier.

4. A magnetic head device according to claim 1, in which said magnetically shielding structure is a one-piece ferrite part of said device.

5. A magnetic head device according to claim 1, in which said magnetically shielding structure is composed of a plurality of ferrite parts fitted together at machined surfaces of the respective parts.

6. A magnetic head device as defined in claim 3, in which said aperture of said magnetically shielding structure is a machined aperture fitting said surrounded portion of a said magnetic head mounted on a said carrier.

7. A magnetic head device as defined in claim 1, wherein said plurality of said magnetic heads is equal in number to the plurality of said magnetically shielding structures.

8. A magnetic head device as defined in claim 1, in which said plurality of said shielding structures and therefore said plurality of said magnetic heads partly surrounded and covered thereby is less in number than said plurality of carriers.

9. A rotary multiple-magnetic head device of a recording and/or playback apparatus for scanning magnetic tape records comprising:

a headwheel (1), having an axis of revolution and having a periphery, and a plurality of magnetic head carriers (8) each mounted at the periphery of said headwheel and having a tip portion located radially beyond the periphery of said headwheel;

a plurality of magnetic heads mounted on said carriers, including a magnetic head mounted on each of said carriers, not more than two said heads being mounted on any one of said carriers, each of said magnetic heads having a first portion projecting away from said axis beyond the tip portion of said carrier on which it is mounted for intermittent contact of a tip region of said first magnetic head portion with said tape when said headwheel revolves and a second portion affixed to said carrier and having a surface substantially flush with a surface of said tip portion of said carrier;

a plurality of magnetically shielding structures of a material having low magnetic reluctance and high magnetic permeability, each mounted on one of said carriers and surrounding all but said tip region of every said first magnetic head portion and covering every said second magnetic head portion mounted on said one of said carriers, said shielding structures being of configurations which form, together with the respective carriers on which they are mounted, respective pockets within which are encased all but magnetic head tip regions of heads mounted on said carriers.

10. A magnetic head device according to claim 9, in which each said magnetically shielding structure includes a first piece having a cross-sectional profile of a shallow rectilinear U-shape having a closed end and an open end and having its open end extending beyond a said carrier on which it is mounted, said first piece being affixed to said carrier on the side of said carrier which is elsewhere adjacent and affixed to said headwheel, and a second piece in strip form fitting against a portion of said first piece adjacent to its open end for surrounding all but said tip region of said first portion of not more than two said magnetic heads mounted on the same carrier on which said magnetically shielding structure is mounted.

11. A magnetic head device according to claim 9, in which each said magnetically shielding structure, where it surrounds part of said first portion of not more than two said magnetic heads mounted on the same carrier on which said magnetically shielding structure is mounted, provides an aperture fitting and thereby surrounding all but said tip region of said first portion of not more than two said magnetic heads mounted on the same carrier on which said magnetically shielding structure is mounted.

12. A magnetic head device according to claim 1, in which each of said magnetically shielding structures is a one-piece ferrite part of said device.

13. A magnetic head device according to claim 1, in which each of said magnetically shielding structures is composed of a plurality of ferrite parts fitted together at machined surfaces of the respective parts.

14. A magnetic head device as defined in claim 11, in which said aperture of each said magnetically shielding structure is a machined aperture fitting said surrounded portion of not more than two said magnetic heads mounted on the same carrier on which the respective magnetically shielding structure is mounted.

15. A magnetic head device as defined in claim 9, wherein said plurality of said magnetically shielding structures is less in number than the plurality of said magnetic heads.

* * * * *